(Model.)
G. B. MALETTE.
VEHICLE SPRING.
No. 301,615.     Patented July 8, 1884.
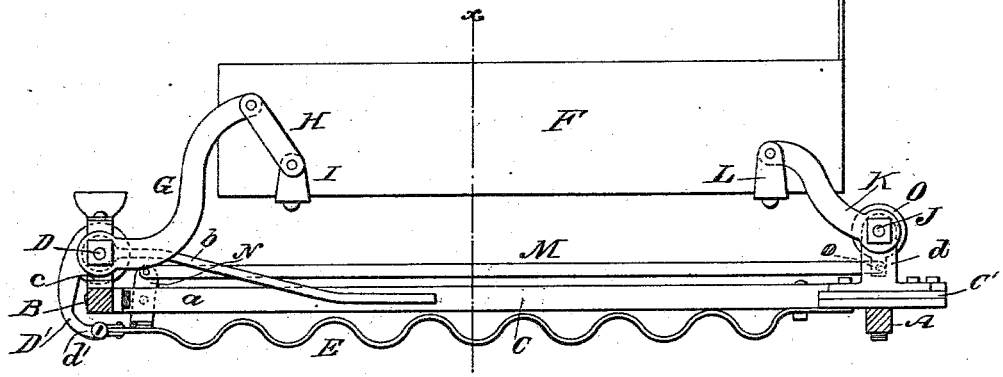
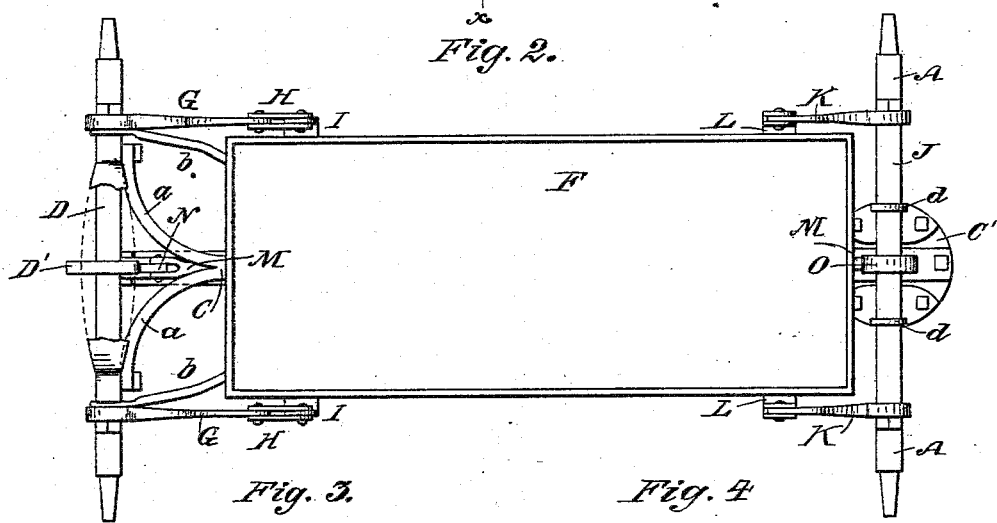
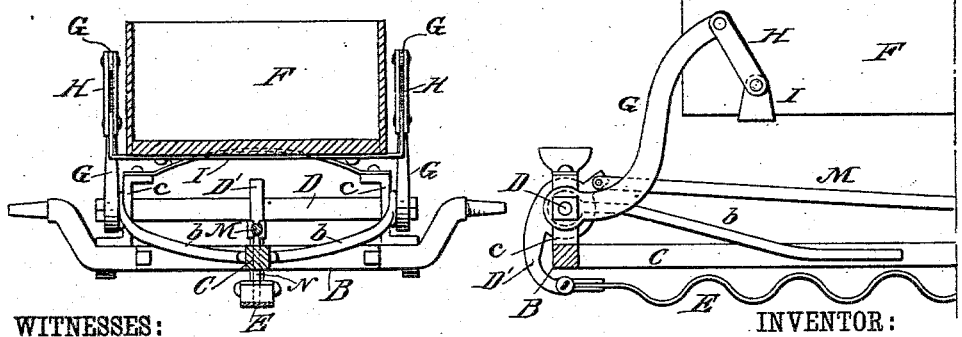
WITNESSES:
INVENTOR:
G. B. Malette
BY
ATTORNEYS.

UNITED STATES PATENT OFFICE.

GEORGE B. MALETTE, OF WATKINS, NEW YORK.

VEHICLE-SPRING.

SPECIFICATION forming part of Letters Patent No. 301,615, dated July 8, 1884.

Application filed November 13, 1883. (Model.)

*To all whom it may concern:*

Be it known that I, GEORGE B. MALETTE, of Watkins, in the county of Schuyler and State of New York, have invented new and useful Improvements in Vehicles, of which the following is a full, clear, and exact description.

This invention consists, first, in a new corrugated or serpentine anti-friction spring for vehicles; also, in novel contrivances for connecting said spring or springs with the body in such manner that the body of the vehicle will always be depressed equally without reference to the locality of the load therein, whether it be central or equally distributed or not.

Reference is to be had to the accompanying drawings, forming part of this specification, in which similar letters of reference indicate corresponding parts in all the figures.

Figure 1 is a side elevation of a vehicle embodying the principle of my invention, the axles being shown in section. Fig. 2 is a plan view of the same. Fig. 3 is a transverse sectional elevation of the same, taken on the line $x\ x$ of Fig. 1; and Fig. 4 is a detailed sectional elevation of a part of the vehicle, showing a modification.

A represents the forward axle, and B the rear axle. These are connected by the reach C, which is divided to form the arms $a\ a$ at its rear end, provided with the plate C' at its forward end, and braced from the ends of the rear bolster, D, by the rods $b\ b$, and in the construction shown the spring E of the vehicle is arranged under and attached at its forward end to the reach C, as shown clearly in Fig. 1. The said rear bolster, D, is journaled in the upright pieces $c\ c$, secured upon the rear axle, B, and the rear end of the box or body F of the vehicle is attached to the said bolster by the arms G G, secured to the ends of the said bolster, and the links H H, which connect the outer ends of said arms G G to the ends of the straps I, bolted to the under side of the box F. The forward bolster, J, is journaled in the uprights $d\ d$, rising from the plate C', and the forward end of the body or box F is attached to the bolster J by the arms K K, secured to the ends of the bolster, the outer ends of said arms being pivoted to the ends of the straps L, bolted to the under side of the box F, near its forward end. The spring E, which is a corrugated or serpentine spring, is, as above mentioned, attached at its forward end to the reach C. At its rear end the spring E is attached to the rear bolster, D, by the curved arm or lever D', rigidly secured to the bolster and projecting below it. The spring E is also attached to the forward bolster, J, and below it by the connecting-rod M, armed collar O, rigidly secured to the bolster, and the short lever N, hinged to the spring and pivoted between the arms $a\ a$ of the reach C, the rod M connecting the upper end of said short lever N to the downwardly-projecting arm $o$ of the said collar O, as shown in Fig. 1, so that any rolling movement of either bolster, due to non-central or unevenly-distributed load being placed in the body or box F, will distend the spring E, and at the same time communicate a reverse rolling motion to the other bolster—that is to say, if the load be placed in the rear end of the box or body F, the downward movement of the rear end of the box F due to such load will, through links H and arms G, turn or roll forward the bolster D in its bearings. This rolling or oscillating movement of the bolster D will draw backward the lower end, $d'$, of the arm or lever D', which will distend the spring E, obtaining its elasticity. The extension of the spring E will draw backward the lower end of the short lever N, and cause its upper end, through connecting-rod M and arm $o$, to turn or roll backward the forward bolster, J, a distance corresponding to the rolling movement of the rear bolster, D, thus permitting the forward end of the box or body F to descend to the level of the loaded rear end of the box or body. If the load should be placed in the forward, instead of the rear, end of the body or box F, the downward movement of the forward end of the box F will, through arms K, roll backward the forward bolster, J. This movement will, through arm $o$ and rod M, draw forward the upper end of the short lever N and force its lower end backward, which will distend spring E, and at the same time, through lever or arm D', roll the rear bolster, D, forward, thus permitting the rear end of the box or body F to descend to the same level with the loaded forward end. If the load should be placed exactly central in the box or body F, or is evenly distributed therein, the bolsters D J will be turned equally in their bearings by the downward movement of the box or body F, both acting equally through their respective connections with the spring E, to distend it, so that in all cases the level of the box or body F will always be maintained without reference to the locality of the load therein, and in all cases the elasticity of the spring will be applied equally to all parts of the body or box F, though only a single spring is used. I do not, however, confine myself to the use of a single spring, as for side-bar buggies I design to use a spring under each side bar, and for heavy vehicles more than one spring; nor do I confine myself to the application of my invention to road-vehicles, as it is applicable also to railroad and street cars. In some cases I shall dispense with the short lever N, and connect the bolsters D J above and below by rod M, as shown in Fig. 4, which, upon loading the box F, will communicate reverse turning motion to the said bolsters with the same results as above described. By attaching the box to the arms of the rolling bolster, it will be seen, as all of the arms oscillate together, that the box or body F is at all times held from tipping sidewise as well as endwise.

Having thus described my invention, what I claim as new, and desire to secure by Letters Patent, is—

1. In a vehicle, the corrugated or serpentine anti-friction spring E, connected to the box or body, with suitable contrivances for causing the load to distend the said spring E, and by its elastic resistance to support the load, substantially as and for the purposes set forth.

2. The box or body F, connected to the rolling bolsters D J by suitable arms and links, in combination with the spring arranged in the longitudinal plane of the body and beneath the reach C, and having one end secured thereto, and connections between the free end of the spring and the front and rear bolsters, substantially as set forth.

3. The spring E, connected to the rolling bolster D, in combination with rod M, connected to rolling bolster J, and lever N, hinged to spring E, substantially as and for the purposes described.

4. The rolling bolsters D J, provided with arms G K, to which the box F is attached, in combination with the spring E, attached to bolster D by arm D', and lever N and rod M, connected to bolster J, the lever N being hinged to the spring, substantially as and for the purposes set forth.

GEORGE B. MALETTE.

Witnesses:
S. S. BENHAM,
JOSEPH CATON.